Figure 1:
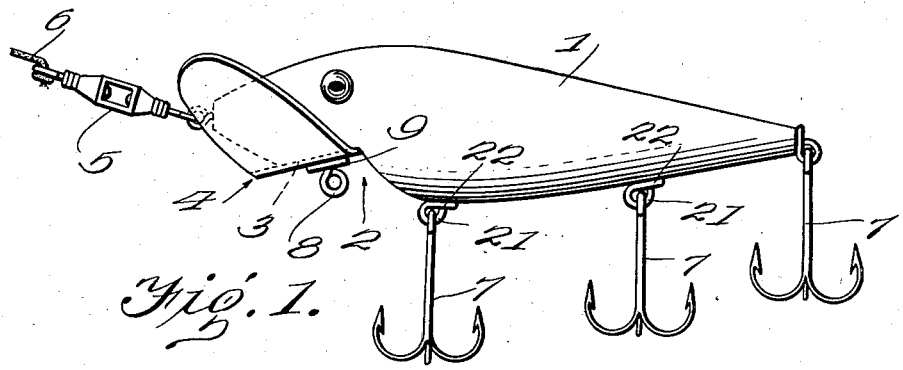

J. W. REYNOLDS.
ARTIFICIAL BAIT.
APPLICATION FILED APR. 16, 1914.

1,133,669.

Patented Mar. 30, 1915.
2 SHEETS—SHEET 1.

Witnesses

Inventor
J. W. Reynolds.
By H. B. Willson & Co.
Attorneys

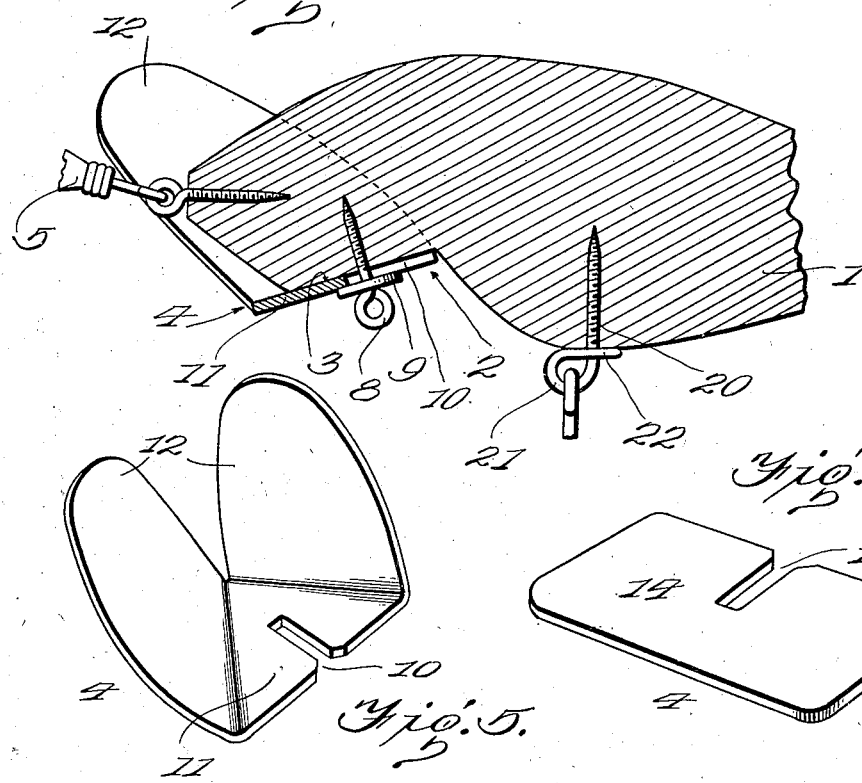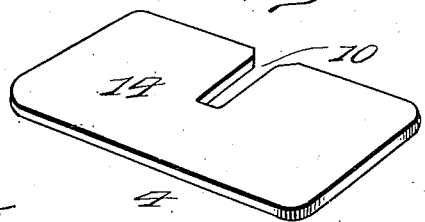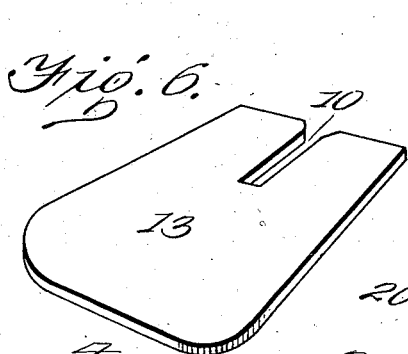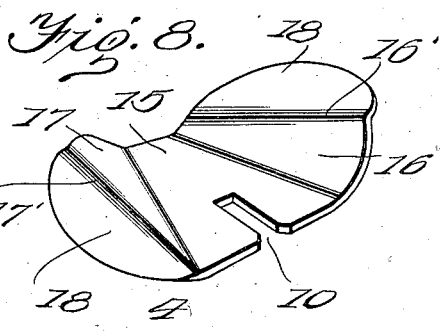

UNITED STATES PATENT OFFICE.

JAMES W. REYNOLDS, OF CHICAGO, ILLINOIS.

ARTIFICIAL BAIT.

1,133,669.

Specification of Letters Patent.

Patented Mar. 30, 1915.

Application filed April 16, 1914. Serial No. 832,235.

*To all whom it may concern:*

Be it known that I, JAMES W. REYNOLDS, a citizen of the United States, residing at Chicago, in the county of Cook and State of Illinois, have invented certain new and useful Improvements in Artificial Bait; and I do declare the following to be a full, clear, and exact description of the invention, such as will enable others skilled in the art to which it appertains to make and use the same.

My invention relates to improvements in artificial bait and has for its primary object to provide a device of this character which will effectually attract fish or other sea food. To the above end, I provide a representation of a minnow, a number of hooks depending therefrom and a number of fins for attachment to the minnow.

A secondary object of the invention is to construct the fins in such a manner as to cause them to produce different effects upon the movements of the minnow when the same is being drawn through the water.

Still another object of the invention is to provide simple and efficient means whereby the fins may be readily attached or detached.

With the above objects in view, the invention resides in certain novel features of construction and combination herein described and claimed and shown in the drawings wherein:—

Figure 2:
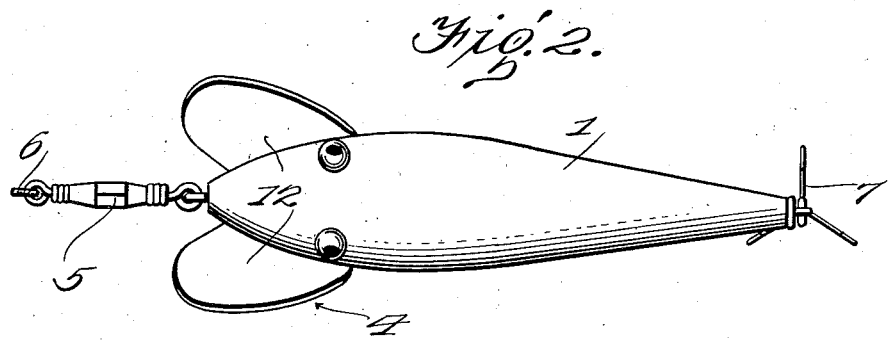
Figure 3:
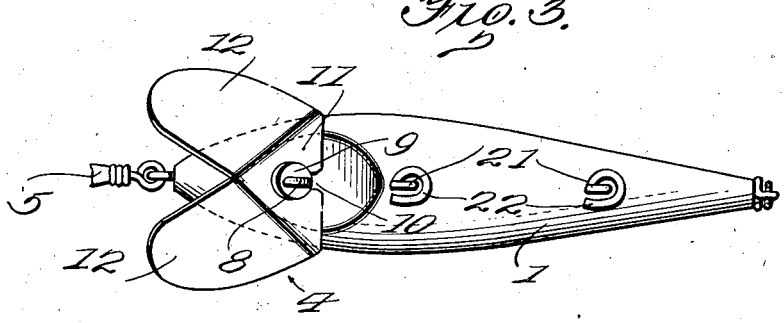

Figure 1 is a side elevation of a device constructed in accordance with my invention, a fin being attached which will cause the minnow to float upon the top of the water, sending ripples to either side; Fig. 2 is a plan view of the parts shown in Fig. 1; Fig. 3 is a bottom plan view showing more particularly the manner in which the fins are attached; Fig. 4 is a central vertical longitudinal section; Fig. 5 is a perspective view of the form of fin so far illustrated; Fig. 6 is a perspective view of a fin which, when applied, will cause the minnow to dive and remain beneath the water as long as the same is drawn forwardly; Fig. 7 is a similar view of a fin which will cause the device to move slightly beneath the surface of the water; Fig. 8 is a perspective view of an attachment which will cause the bait to revolve and move forwardly in a zigzag direction; and Fig. 9 is a perspective view showing the means for attaching the hooks to the bait.

In the accompanying drawings, I have illustrated my invention as including a body 1 which constitutes a representation of a minnow, said body having its forward lower portion provided with a transversely extending notch 2, the front wall of said notch inclining downwardly and forwardly as indicated at 3 and being adapted to support any one of a number of fins 4 which may be constructed in various shapes and sizes and may be variably colored for the purpose of more effectually attracting the fish. The device further includes a swivel 5 which is attached to the nose of the body 1 and is adapted to receive the line 6, a number of multiple hooks 7 which are hung from the lower side of the body 1 in a manner to be described, and a fin attaching screw 8 which enters the inclined portion 3, a washer 9 being disposed between its head and said surface 3. It is between this washer 9 and the inclined surface 3 that the fins 4 are attached, each of said fins having a longitudinal slot 10 opening at its rear edge and adapted to be passed over the screw 8, said slots being formed in flat portions of said fins. When the parts are assembled, and the screw 8 is tightened, the washer 9 will force said flat portions into binding contact with the inclined face 3 thereby rigidly yet removably retaining the fins in position.

In the drawings I have illustrated four forms of fins which may well be employed in connection with my invention. The form shown in Figs. 1 to 5 comprises a flat face portion 11 in the form of an isosceles triangle from two sides of which deflecting blades 12 rise and project forwardly and upwardly from the under side of the bait on opposite sides thereof. It is to be understood that the face portion 11 is provided with the open slot 10, which extends inwardly from its rear straight edge and this feature is common to all of the forms of fins illustrated. When the invention is equipped with this attachment, the body 1, when pulled forwardly by the line 6, will move along the top of the water, the blades 12 acting to produce this effect and also to send small ripples outwardly from either side of the bait, thus effectually representing the ripples caused by a swimming minnow.

In Fig. 6 I have shown a fin as comprising a flat metal plate 13 having its forward portion widened while its rear end is provided with the notch 10. When this form of the invention is applied to the wall 3 of the bait, the plate 13 will of course incline downwardly and forwardly, thus causing the body 1 to dive as the same is pulled forwardly through the water.

Fig. 7 illustrates a form of fin very similar to the form illustrated in Fig. 6, this form comprising a substantially rectangular plate 14 which is elongated laterally and is provided with the notch 10, this form of fin causing the body 1 to move directly beneath the surface of the water when the same is pulled forwardly.

The form of fin illustrated in Fig. 8 comprises a truncated triangular attaching plate 15 which is provided on its opposite edges with upwardly and outwardly inclining flanges 16 and 17. The upper edge of the flange 16 inclines upwardly and rearwardly from a point near the front edge of plate 15 as indicated at 16' while the upper edge of the flange 17 inclines upwardly and forwardly from a point at the rear edge of said plate as shown at 17'. Each of the flanges 16 and 17 so produced is substantially triangular in form with the apex of one arranged at the front of the fin and the apex of the other disposed at the rear thereof. Each of these flanges 16 and 17 is provided with a laterally projecting flange 18, the inclination of these flanges being the same as the inclination of the upper edges of said flanges 16 and 17. This form of the invention like the forms previously described, is provided with the rearwardly opening notch 10 and when in position upon the body 1, will cause said body to rotate or spin and to move in a zigzag direction, when pulled through the water.

As above suggested, the hooks are detachably connected to the body 1, these connections being preferably in the form of shanks 20 which are threaded into the under side of said body, said shanks having their lower portions bent to form vertical eyes 21 and horizontal eyes 22 above said eyes 21 and being held in removable contact with the under side of the body 1 by the threaded engagement of the shank therewith. As clearly shown in the perspective view of this detail, the horizontal eye and its point of juncture with the vertical eye are out of contact with the shank, this provision being made in order that the usual loops on the shanks of the hooks may be engaged with the horizontal eyes and then turned until they rest within the vertical eyes, the shanks being then turned until the screw threads bring said horizontal loops into contact with the body 1, thereby preventing removal of the hooks until the shanks are rotated in reverse directions.

From the foregoing description, taken in connection with the accompanying drawings, it will be seen that I have produced a comparatively simple artificial bait yet one which I deem will be highly efficient in operation.

As above suggested, the various fins 4 may be furnished in different sizes and colors. I prefer to provide a set of fins of each type, each one of which is of a different color since it has been found that different colors prove advantageous in the different conditions of weather.

The construction and operation of the invention will be readily understood from the foregoing description, taken in connection with the accompanying drawings and a further description thereof is not thought to be necessary.

Various changes in form, proportion and minor details may be resorted to without departing from the spirit of the invention as claimed.

Having thus described my invention, what I claim as new and desire to secure by Letters Patent is:

1. An artificial bait including a body representing a fish and having a downwardly and forwardly inclining surface on the forward portion of its under side, a fin, means for securing said fin to said inclined surface, and a hook carried by said body.

2. An artificial bait including a body representing a fish and having a downwardly and forwardly inclining surface on the forward portion of its under side, an attaching screw entering said inclining surface, and having a head, a triangular attaching plate having a slot opening through its rear edge, and adapted to straddle said screw, between its head and said surface, upwardly and outwardly inclining deflecting plates rising from the remaining edges of the plate and projecting forward of the body, and a number of hooks depending from the body.

In testimony whereof I have hereunto set my hand in presence of two subscribing witnesses.

JAMES W. REYNOLDS.

Witnesses:
 H. C. GROGG,
 J. G. EGERTER.